(12) United States Patent
Reddy et al.

(10) Patent No.: US 9,840,659 B2
(45) Date of Patent: Dec. 12, 2017

(54) DEACTIVATION AND ACTIVATION OF PERMEABILITY MODIFIERS FOR USE IN SUBTERRANEAN FORMATION OPERATIONS

(71) Applicant: Halliburton Energy Services, Inc., Houston, TX (US)

(72) Inventors: B. Raghava Reddy, The Woodlands, TX (US); Anindya Ghosh, Little Rock, AR (US); Antonio Recio, III, Humble, TX (US); Larry S. Eoff, Porter, TX (US); Christopher A. Lewis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/896,673

(22) PCT Filed: Feb. 2, 2015

(86) PCT No.: PCT/US2015/014111
§ 371 (c)(1),
(2) Date: Dec. 8, 2015

(87) PCT Pub. No.: WO2016/126233
PCT Pub. Date: Aug. 11, 2016

(65) Prior Publication Data
US 2016/0369160 A1    Dec. 22, 2016

(51) Int. Cl.
*E21B 43/14* (2006.01)
*C09K 8/035* (2006.01)
(Continued)

(52) U.S. Cl.
CPC .............. *C09K 8/602* (2013.01); *C09K 8/035* (2013.01); *C09K 8/56* (2013.01); *C09K 8/60* (2013.01);
(Continued)

(58) Field of Classification Search
CPC .. C09K 8/5083; C09K 2208/30; C09K 8/035; C09K 8/12; C09K 8/506; C09K 8/508;
(Continued)

(56) References Cited

U.S. PATENT DOCUMENTS 6,476,169 B1    11/2002  Eoff et al.
7,563,750 B2    7/2009   Eoff et al.
(Continued)

FOREIGN PATENT DOCUMENTS

WO    2010103421 A1    9/2010
WO    2015065351 A1    5/2015
WO    2015065378 A1    5/2015

OTHER PUBLICATIONS

International Search Report and Written Opinion for PCT/US2015/014111 dated Oct. 21, 2015.

*Primary Examiner* — Doug Hutton, Jr.
*Assistant Examiner* — Charles Nold
(74) *Attorney, Agent, or Firm* — McDermott Will & Emery LLP (57) ABSTRACT

Methods including deactivation and activation of permeability modifiers for use in subterranean formation operations. A first treatment fluid may be introduced into a subterranean formation having a first treatment zone having a first aqueous permeability value, the first treatment fluid comprising a first aqueous base fluid and a deactivated permeability modifier. The deactivated permeability modifier may be adsorbed onto a surface of the first treatment zone. A second treatment may thereafter be introduced into the subterranean
(Continued)

formation, the second treatment fluid comprising a second aqueous base fluid and a cyclodextrin compound. The second treatment fluid may contact the deactivated permeability modifier to activate the permeability modifier by complexing the deactivating surfactant with the cyclodextrin compound, thereby forming an activated permeability modifier adsorbed onto the surface of the first treatment zone and reducing the aqueous permeability of the first treatment zone.

19 Claims, 4 Drawing Sheets

(51) Int. Cl.
    *C09K 8/60*     (2006.01)
    *C09K 8/56*     (2006.01)
    *C09K 8/62*     (2006.01)
    *E21B 43/16*     (2006.01)

(52) U.S. Cl.
    CPC ............... *C09K 8/62* (2013.01); *E21B 43/14* (2013.01); *E21B 43/162* (2013.01)

(58) Field of Classification Search
    CPC ...... C09K 8/5086; C09K 8/514; C09K 8/588; C09K 8/602; E21B 43/14; E21B 43/162
    See application file for complete search history.

(56) References Cited

U.S. PATENT DOCUMENTS

| | | |
|---|---|---|
| 8,420,576 B2 | 4/2013 | Eoff et al. |
| 2004/0102331 A1 | 5/2004 | Chan et al. |
| 2005/0000694 A1 | 1/2005 | Dalrymple et al. |
| 2009/0181866 A1 | 7/2009 | Reddy et al. |
| 2011/0105369 A1 | 5/2011 | Reddy |
| 2011/0294704 A1 | 12/2011 | Eoff et al. |
| 2012/0111564 A1 | 5/2012 | Reddy et al. |
| 2013/0118743 A1* | 5/2013 | Partain, III ........... C04B 24/383 166/292 |

* cited by examiner

DEACTIVATION AND ACTIVATION OF PERMEABILITY MODIFIERS FOR USE IN SUBTERRANEAN FORMATION OPERATIONS

BACKGROUND

The present disclosure generally relates to subterranean formation operations, and, more specifically, selective deactivation and activation of permeability modifiers for use in subterranean formation operations.

The production of water with hydrocarbons (e.g., oil) from subterranean wells constitutes a major problem and expense in the production of the hydrocarbons. While hydrocarbon-producing wells are usually completed in hydrocarbon-bearing formations, such formations may contain, or may be adjacent to, water-bearing sections. Generally, the term "water-bearing section," and grammatical variants thereof, refers to any portion of a subterranean formation that may produce water, including a hydrocarbon-bearing section that has sufficiently high water saturation such that water may be produced along with hydrocarbons. The high mobility of water in a subterranean formation may allow it to flow into a wellbore therein by way of natural fractures and/or high permeability streaks present in the formation. Over the life of such wellbores, the ratio of water to hydrocarbons recovered may be undesirable in view of the cost of producing the water, separating it from the hydrocarbons, and disposing of it, which can represent a significant economic loss.

Subterranean stimulation treatments may be employed to increase the flow of hydrocarbons into a wellbore. One such stimulation treatment is hydraulic fracturing, where treatment fluids are pumped into the subterranean formation at a rate and pressure sufficient to create or enhance at least one fracture therein, thereby increasing fluid flow through the formation into a wellbore therein. Proppant packs and/or gravel packs may be formed within the formation to further facilitate fluid flow into the wellbore. When a formation contains water-bearing sections, however, stimulation may lead to the undesired, increased production of water with the hydrocarbons.

Another subterranean stimulation treatment is acid stimulation (e.g., "acidizing"), in which an aqueous treatment fluid comprising an acid is introduced into the formation to dissolve acid-soluble materials that may clog or constrict formation channels, thereby potentially widening the pathways through which hydrocarbons may flow from the formation into a wellbore. Acid stimulation treatments also may facilitate the flow of injected treatment fluids from the well bore into the formation. In certain circumstances, however, the acidizing treatment fluids may undesirably enter the water-bearing sections instead of the hydrocarbon-bearing sections in the formation because the water-bearing sections may be more permeable to the aqueous acidizing treatment fluid than the hydrocarbon-bearing sections. Thus, acid stimulation treatments may result in an undesirable increase in the production of water.

During drilling and/or stimulation of a subterranean formation, water may undesirably enter into a wellbore formed or being formed therein, as described. However, the treatment fluids used in such subterranean formation operations, and others, may also become lost in the subterranean formation in high permeable zones, for example. This "fluid loss" may result in a buildup of solid materials (e.g., proppant, weighting agents, and the like), or a "filter cake," against a face of the wellbore, which may result in ineffective treatment fluids, a decline in produced fluid flow, formation damage, and the like. Accordingly, the flow of water or other non-produced fluids into or out of the formation may result in significant remedial measures, reduced production, and the like.

Permeability modifiers, also termed "relative permeability modifiers" have been effective at decreasing the production of water with hydrocarbons, and decreasing the fluid loss into a formation, and are used in a variety of subterranean formation operations including, but not limited to, drilling, stimulation, water control, acid diversion, injection fluid profile modification, fluid loss control, gravel packing operations, and the like. The permeability modifiers are capable of altering the relative permeability of a portion of a wellbore that they come into contact with, resulting in blockage of water production and/or diversion of aqueous fluids away from that portion of the wellbore.

However, pressure increases are often encountered during introduction of these permeability modifiers in a treatment fluid through pumping equipment, which limits the amount of such fluid that may be introduced and the depth of penetration. Such a reduced amount of fluid may result in less than desired formation coverage. Because of the pressure increases, injection rates must be reduced to allow placement of sufficient volumes of the fluid comprising the permeability modifier into a formation without breaching the fracture gradient. As used herein, the term "fracture gradient" refers to the pressure necessary to create or enhance at least one fracture in a subterranean formation. Such injection pressure limitations are particularly heightened in subterranean formations having low permeability zones (e.g., less than about 100 millidarcy (mD)).

Additionally, although the permeability modifiers may decrease or prevent water production and fluid loss, during production of the subterranean formation, these permeability modifiers may also impede flow of produced fluids. As such, the permeability modifiers are particularly useful in wellbores where there is no concern that the effects of the permeability modifier (e.g., reduction in water permeability) may remain in effect for a period longer than desired or permanently, but may require removal or otherwise deactivation in hydrocarbon producing wells.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present disclosure generally relates to subterranean formation operations, and, more specifically, selective deactivation and activation of permeability modifiers for use in subterranean formation operations. Additionally, the selective deactivation and activation of the permeability modifiers described herein further increase the injectivity profile of the permeability modifiers into a formation that, when activated, demand increased pump pressures. As used herein, the term "injectivity" refers to fluid injection or introduction into a subterranean formation at pressures below the fracture gradient. In some instances, the injectivity profile of the selectively deactivated and activated permeability modifiers described herein may be about 25% less than the fracture gradient, or even lower, without departing from the scope of the present disclosure. In some embodiments, the injectivity profile of the deactivated permeability modifiers of the instant disclosure may be pumped into a subterranean formation, as described in detail below, at a pump rate in the range of a lower limit of about 0.25 barrels per minute (BPM), 0.5 BPM, 0.75 BPM, 1 BPM, 1.25 BPM, 1.5 BPM, 1.75 BPM, 2 BPM, 2.25 BPM, 2.5 BPM, 2.75 BPM, 3 BPM, 3.25 BPM, 3.5 BPM, 3.75 BPM, 4 BPM, 4.25 BPM, 4.5 BPM, 4.75 BPM, and 5 BPM to an upper limit of about 10 BPM, 9.75 BPM, 9.5 BPM, 9.25 BPM, 9 BPM, 8.75 BPM, 8.5 BPM, 8.25 BPM, 8 BPM, 7.75 BPM, 7.5 BPM, 7.25 BPM, 7 BPM, 6.75 BPM, 6.5 BPM, 6.25 BPM, 6 BPM, 5.75 BPM, 5.5 BPM, 5.25 BPM, and 5 BPM, encompassing any value and subset therebetween. In some embodiments, the deactivated permeability modifiers described herein may be injected at low pump rates to desired depths in a subterranean formation without any or without substantial self-diversion, and then their activity restored in situ according to the methods described herein.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having the benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques. Generally, the term "about" mean+/−5% of the numeral it modifies, encompassing any value and subset therebetween.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure may describe the selectively deactivated and activated permeability modifiers of the present disclosure with reference to certain subterranean formation operations (e.g., injection operations); however, the selectively deactivated and activated permeability modifiers described herein may be used in any subterranean formation operation that may benefit from their qualities, as described herein. Such subterranean formation operations may include, but are not limited to, injection operations, stimulation operations, drilling operations, sand control operations, conformance control operations, fluid loss control operations, acid diversion operations, fracturing operations, gravel packing operations, perforating operations, well clean out operations, and the like, and any combination thereof.

In some embodiments, the present disclosure provides a method comprising introducing a first treatment fluid into a subterranean formation having a first treatment zone comprising an aqueous permeability equal to a first aqueous permeability value. The subterranean formation may be, but is not limited to, a hydrocarbon-bearing well, a water-bearing well, or an injection well. As used herein, the term "aqueous permeability" refers to the ability of fluids to flow through a porous medium (e.g., a subterranean formation). The first treatment fluid may comprise a first aqueous base fluid and a deactivated permeability modifier (which also may be referred to as a "disproportional permeability modifier"), wherein the deactivated permeability modifier is formed from a deactivating surfactant and a permeability modifier. As used herein, the term "permeability modifier" refers to a water-soluble polymer comprising a hydrophilic polymer backbone that selectively reduces the effective permeability of at least a portion of a subterranean formation to aqueous fluids. The deactivated permeability modifier may be formed by (1) micellar formation and/or (2) complexation between the deactivating surfactant and the permeability modifier. As used herein, the term "complexation" refers to associations between the hydrophobic groups of the deactivating surfactant and the hydrophobic groups of the permeability modifier.

The deactivated permeability modifier may be formed because the deactivating surfactant has an affinity for the permeability modifier. Without being bound by theory, it is believed that the deactivating surfactant effectively deactivates some or all of the hydrophobic associations (e.g., hydrophobic groups) responsible for the function of the permeability modifier by, as one example, incorporation of the hydrophobic chains of the permeability modifier into micelles. By deactivating the hydrophobic associations, the inter-molecular and intra-molecular association among the permeability modifier polymer chains is reduced or prevented, resulting in a partial or full loss of permeability control to aqueous fluids by the permeability modifier. Indeed, it is these molecular hydrophobic associations (both inter- and intra-molecular), in addition to adsorption onto subterranean formation surfaces (e.g., rock), that is critical to the function of the permeability modifiers described herein. Although described with reference to micellar formation, deactivation of the hydrophobic associations may also be achieved through other mechanisms, such as complexation, without departing from the scope of the present disclosure.

After introducing the first treatment fluid into the subterranean formation, the deactivated permeability modifier may be adsorbed onto a surface of the subterranean formation in the first treatment zone. The deactivated permeability modifier will not affect or substantially affect the permeability of the surface onto which it is adsorbed because of the deactivation of the permeability modifier by the deactivating surfactant, as described above. However, the deactivating surfactant will not or substantially will not affect the ability of the deactivated permeability modifier to adsorb onto the subterranean formation face. As used herein, the term "substantially" means largely, but not necessarily wholly.

A second treatment fluid may be introduced into the subterranean formation, where the second treatment fluid is contacted with the deactivated permeability modifier adsorbed onto the formation at the first treatment zone. The second treatment fluid may comprise a second aqueous base fluid and a cyclodextrin compound. The contact between the cyclodextrin in the second treatment fluid and the deactivated permeability modifier may cause activation (or reversing the deactivation) of the permeability modifier comprised therein (i.e., comprising part of the deactivated permeability modifier), thereby forming an activated permeability modifier. Without being bound by theory, it is believed that the activation of the permeability modifier is caused by competitive dissociation of the deactivating surfactant and the permeability modifier in the deactivated permeability modifier. That is, the deactivating surfactant has a higher affinity for complexing with the cyclodextrin than it does for the hydrophobic groups of the permeability modifier. As used herein, the term "complexing," and grammatical variants thereof (e.g., complex), refers to the inclusion of the hydrophobic tail of the deactivating surfactant into the hydrophobic internal cavity of the cyclodextrin compound. This "complexation" prevents the micellar formation of the deactivating surfactant required for deactivation of the permeability modifier.

Activation of the permeability modifier does not affect the absorption of it on the subterranean formation. Rather, the deactivating surfactant simply becomes wholly or partially disassociated therefrom due to formation of the cyclodextrin and deactivating surfactant complex, leaving behind the activated permeability modifier adsorbed onto the subterranean formation at the first treatment zone. The activated permeability modifier then is able to reduce the aqueous permeability of the first treatment zone to a second aqueous permeability value that is less than the first aqueous permeability value. In some embodiments, the second aqueous permeability value may be in the range of from a lower limit of about 5%, 10%, 15%, 20%, 25%, 30%, 35%, 40%, and 50% to an upper limit of about 99.5%, 95%, 90%, 85%, 80%, 75%, 70%, 65%, 60%, 55%, and 50% less than the first aqueous permeability value, encompassing any value and subset therebetween.

In some embodiments, a third treatment fluid may be introduced into the subterranean formation to contact the activated permeability modifier. The third treatment fluid may comprise a third aqueous base fluid and a second deactivating surfactant. Upon contact of the third treatment fluid with the activating permeability modifier, the second deactivating surfactant may interact with the activated permeability modifier by micellar formation or complexation to deactivate the activated permeability modifier, thereby restoring the aqueous permeability of the first treatment zone to the first aqueous permeability value. The deactivation may be achieved by, for example, one or more non-limiting mechanisms described above (e.g., blocking hydrophobic associations).

In some embodiments, any or all of the methods or method steps described above may be repeated at at least a second treatment zone in the subterranean formation. That is, the method may be serially repeated or may affect one or more treatment zones simultaneously, without departing from the scope of the present disclosure.

The first, second, and third treatment fluids each comprise a first, second, and third aqueous base fluid, respectively. Each of these aqueous base fluids may be the same or different, without departing from the scope of the present disclosure. That is, each may be different, two may be the same, or all may be the same. Unless otherwise stated, as used herein, the term "treatment fluid" will be collectively used to refer to the first, second, and third treatment fluids of the embodiments herein. Similarly, unless otherwise stated the term "aqueous base fluid" will be collectively used to refer to the first, second, and third aqueous base fluids of the embodiments herein. Examples of suitable aqueous base fluids may include, but are not limited to, fresh water, saltwater (e.g., water containing one or more salts dissolved therein), brine (e.g., saturated salt water), seawater, produced water (e.g., water that is recovered along with oil or gas from a subterranean formation), reclaimed water (e.g., treated or untreated wastewater), and the like, and any combination thereof.

The deactivated permeability modifier of the present disclosure comprises a deactivating surfactant and a permeability modifier. The deactivating surfactant may be any surfactant capable of deactivating (e.g., by blocking hydrophobic groups) the permeability modifier. In some embodiments, the deactivating surfactant may be, but is not limited to, nonionic deactivating surfactant, an anionic deactivating surfactant, a cationic deactivating surfactant, an amphoteric deactivating surfactant, and the like, and any combination thereof. Specific examples of suitable deactivating surfactants may include, but are not limited to, sodium dodecyl sulfate, a betaine, a sulfated alkoxylate, a sulfonated alkoxylate, an alkyl quaternary amine, an alkoxylated linear alcohol, an alkyl sulfonate, an alkyl aryl sulfonate, a C10-C20 alkyldiphenyl ether sulfonate, a polyethylene glycol, an ether of alkylated phenol, an alpha olefin sulfonate, sodium dodecane sulfonate, trimethyl hexadecyl ammonium bromide, any derivative thereof, and the like, and any combination thereof.

In some embodiments, the deactivating surfactant may be present in the treatment fluids described herein in an amount in the range of from a lower limit of about 0.05%, 0.1%, 0.5%, 1%, 10%, 20%, 40%, 60%, 80%, 100%, 120%, 140%, and 160% to an upper limit of about 300%, 280%, 260%, 240%, 220%, 200%, 180%, and 160% by weight of the permeability modifier, encompassing any value and subset therebetween.

The permeability modifier of the present disclosure may, in some embodiments, be a hydrophobically modified water-soluble polymer. Generally, such hydrophobically modified water-soluble polymers are not crosslinked. However, in some embodiments, crosslinking may be permitted. As used herein, the term "hydrophobically modified" refers to a monomer or polymer having hydrophobic compound(s) chemically attached thereto. The hydrophobically modified water-soluble polymer may be cationic; anionic; nonionic;

and any combination thereof. In some embodiments, the hydrophobically modified water-soluble polymers may have molecular weights in the range of from a lower limit of about 500,000, 975,000, 1,450,000, 1,925,000, 2,400,000, 2,875,000, 3,350,000, 3,825,000, 4,300,000, and 4,775,000 to an upper limit of about 10,000,000, 9,525,000, 9,050,000, 8,575,000, 8,100,000, 7,625,000, 7,150,000, 6,675,000, 6,200,000, 5,725,000, 5,250,000, and 4,775,000, and any value therebetween. In some embodiments, the hydrophobically modified water-soluble polymers may have molecular weights in the range of from about 1,000,000 to about 8,000,000. The hydrophobically modified water-soluble polymers may be synthesized by any method known to those having ordinary skill in the art, such as by a polymerization reaction. In some embodiments, the hydrophobically modified water-soluble polymer is used in particulate form during the production of the treatment fluids.

In some embodiments, the hydrophobically modified water-soluble polymer may be synthesized by hydrophobic modification of a hydrophilic polymer. Suitable hydrophilic polymers may include, but are not limited to, a polyacrylamide; a poly(methacrylamide); a polyvinylamine; a poly(vinyl alcohol); a polyvinyl acetate; a polyacrylate; a polyethylene oxide; a polyethylene oxide methyl ether; a polyethylene glycol; a cellulose; a chitosan; a polyamide; a polyetheramine; a polyethyleneimine; a polyhydroxyetheramine; a polylysine; a polysulfone; a starch; a gum; a protein; a poly(itaconic acid); a poly((E)-but-2-enoic acid); a poly(acrylic acid); a poly(malonic acid); a poly(methacrylic acid); a poly(maleic acid); a poly(maleic anhydride); a poly(citraconic anhydride); a poly(2-acrylamidomethylpropanesulfonic acid); a poly(1-allyloxy-2-hydroxypropyl sulfonic acid); a poly(vinyl pyrrolidone); a poly(N-vinyl formamide); a poly(diallyldimethylammonium sulfate); a poly(methacryloylethyltrimethylamine); a poly(dimethylaminopropyl methacrylamide); a poly(2-methacryloxyethyltrimethylammonium chloride); poly(hydroxyethyl acrylate); a poly(vinylsulfonic acid); a poly(vinylphosphonic acid); a poly(N-vinyl caprolactam); a poly(N-vinylformamide); a polymer of N,N-diallylacetamide; a poly(dimethyl-diallyl-ammonium halide); a poly(styrene sulfonic acid); a polymer of methacrylamidoethyltrimethyl ammonium halide; a poly(N,N-dimethylacrylamide); a poly(dimethylaminoethyl methacrylate); any derivative thereof; any copolymer thereof; any terpolymer thereof; and any combination thereof.

Specific hydrophilic polymers for use in the hydrophobically modified water-soluble polymers may include, but are not limited to, a poly(dimethylaminoethylmethacrylate); a poly(acrylamide/dimethylaminoethyl methacrylate); a poly(methacrylic acid/dimethylaminoethyl methacrylate); a poly(2-acrylamido-2-methyl propane sulfonic acid/dimethylaminoethyl methacrylate); a poly(acrylamide/dimethylaminopropyl methacrylamide); a poly(acrylic acid/dimethylaminopropyl methacrylamide); a polymer of acrylic acid and a C10-C30 alkyl acrylate; a hydroxyethyl cellulose; any copolymer thereof; any terpolymer thereof; and any combination thereof.

In some embodiments, the hydrophobically modified water-soluble polymers may be synthesized by a reaction of hydrophilic monomer(s) capable of forming any of the hydrophilic polymers, followed by hydrophobic modification of the hydrophilic polymer. In other embodiments, the hydrophilically modified water-soluble polymers may be formed by a reaction comprising a hydrophilic monomer(s) and a hydrophobically modified hydrophilic monomer(s). The hydrophilic monomer(s) for use in any capacity, including as hydrophilic monomer(s) or as hydrophobically modified hydrophilic monomer(s), may be any monomer capable of forming any hydrophilic polymer that is capable of hydrophobic modification either in its monomer form (as is the case with the hydrophobically modified hydrophilic monomer) or after reacting to form a hydrophilic polymer to become a hydrophobically modified water-soluble polymer. Suitable hydrophilic monomers, for example, for use in any capacity disclosed herein may be any monomer capable of forming the hydrophilic polymers described herein. Examples of suitable hydrophilic monomers include, but are not limited to, acrylamide; methacrylamide; cellulose; vinylamine; vinyl alcohol; vinyl acetate; alkyl acrylate; an acrylate salt of alkali earth metal; an acrylate salt of alkaline earth metal; ethylene oxide; ethylene glycol; glucose; glucosamine; ethyleneimine; lysine; a sulfone; acrylic acid; methacrylic acid; an alkali earth metal salt of methacrylic acid; an alkaline earth metal salt of methacrylic acid; 2-acrylamido-2-methyl propane sulfonic acid; an alkali earth metal salt of 2-acrylamido-2-methyl propane sulfonic acid; an alkaline earth metal salt of 2-acrylamido-2-methyl propane sulfonic acid; N,N-dimethylacrylamide; vinyl pyrrolidone; dimethylaminoethyl methacrylate; dimethylaminopropylmethacrylamide; trimethylammoniumethyl methacrylate chloride; hydroxyethyl acrylate; vinyl sulfonic acid; an alkali earth metal salt of vinyl sulfonic acid; an alkaline earth metal salt of vinyl sulfonic acid; vinyl phosphonic acid; an alkali earth metal salt of vinyl phosphonic acid; an alkaline earth metal salt of vinyl phosphonic acid; vinyl caprolactam; N-vinylformamide; N,N-diallylacetamide; dimethyl-diallyl-ammonium halide; itaconic acid; styrene sulfonic acid; methacrylamidoethyltrimethyl ammonium halide; (E)-but-2-enoic acid; malonic acid; maleic acid; maleic anhydride; citraconic anhydride; 1-allyloxy-2-hydroxypropyl sulfonic acid; N-vinyl formamide; diallyldimethylammonium sulfate; methacrylamidopropyltrimethylammonium chloride; octadecyldimethylammoniumethyl methacrylate bromide; hexadecyldimethylammoniumethyl methacrylate bromide; hexadecyldimethylammoniumpropyl methacrylamide bromide; 2-ethylhexyl methacrylate; hexadecyl methacrylamide; quaternary salt derivatives of acrylamide; quaternary salt derivatives of acrylic acid; and any combination thereof.

In some embodiments, the hydrophilic monomers, hydrophilic polymers, and/or the hydrophobically modified hydrophilic monomers may be additionally be hydrophilically modified so as to, for example, introduce or enhance branching, so long as the function of the hydrophobically modified water-soluble polymer is not adversely affected. The hydrophilic modification may occur before or after hydrophobic modification to a hydrophilic monomer or a hydrophilic polymer and may be achieved using one or more hydrophilic groups. Any compound containing hydrophilic groups capable of introducing into or enhancing the hydrophilicity of the polymer or its branches may be used for hydrophilic modification. Suitable hydrophilic groups may include, but are not limited to, a hydroxyl group; a carbonyl group; a carboxyl group; a sulfhydryl group; an amino group; a phosphate group; a polyether group; any derivative thereof; and any combination thereof. Preferably, if a polyether group is used for hydrophilic modification, it also comprises a halogen; sulfonate; sulfate; organic acid; epichlorohydrin-terminated polyethylene oxide methyl ether; or a derivative thereof. Suitable polyether groups include, but are not limited to, polyethylene oxide; polypropylene oxide; polybutylene oxide; copolymers thereof; terpolymers thereof; and any combination thereof. Typically, the hydrophilic modification of the hydrophilic monomers, hydrophilic polymers, and/or the hydrophobically modified hydrophilic monomers has a weight ratio in the range of from a lower limit of about 1:1, 1.5:1, 2:1, 2.5:1, 3:1, 3.5:1, 4:1, 4.5:1, and 5:1 to an upper limit of about 10:1, 9.5:1, 9:1, 8.5:1, 8:1, 7.5:1, 7:1, 6.5:1, 6:1, 5.5:1, and 5:1, and any value therebetween.

In some embodiments, the backbone or pendent groups of the hydrophobically modified water-soluble polymer (e.g., the hydrophilic polymer backbone formed before or after hydrophobic modification with hydrophobic compound(s)) may comprise reactive amino groups capable of reacting with hydrophobic groups. Suitable amino groups may include, but are not limited to, a dimethyl-amino group, such as those in dimethylaminoethyl methacrylate, a dimethylaminopropyl methacrylamide, and any combination thereof. In other embodiments, the hydrophobically modified water-soluble polymer backbone may comprise polar heteroatoms including, but not limited to, oxygen; nitrogen; sulfur; phosphorous; and any combination thereof in the polymer backbone or pendent groups. Suitable examples may include hydrophobically modified celluloses, starches, gums, and the like. Suitable commercially available hydrophobically modified water-soluble polymers may include, but are not limited to, HPT-1™, a zwitterionic hydrophobically modified water-soluble polymer available from Halliburton Energy Services, Inc. in Houston, Tex.

The hydrophobic compounds capable of reacting with the hydrophilic polymer or a hydrophilic monomer to form the hydrophobically modified water-soluble polymers of the embodiments described herein may include an alkyl halide; a sulfonate; a sulfate; an organic acid; any derivative thereof; and any combination thereof. Suitable hydrophobic compounds include, but are not limited to, octenyl succinic acid; an anhydride of octenyl succinic acid; an ester of octenyl succinic acid; an imide of octenyl succinic acid; an amide of octenyl succinic acid; dodecenyl succinic acid; an anhydride of dodecenyl succinic acid; an ester of dodecenyl succinic acid; an imide of dodecenyl succinic acid; an amide of dodecenyl succinic acid; vinyl ester; alkyl ester of acrylic acid; alkylaryl alcohol ester of acrylic acid; alkyl ester of methacrylic acid; alkylaryl alcohol ester of methacrylic acid; alkyl halide; 1-vinylnaphthalene; and any combination thereof. In certain embodiments, the hydrophobic compound may have an alkyl chain length of from about 6 to about 22 carbons, and any value therebetween. In another embodiment, the hydrophobic group may have an alkyl chain length of from about 7 to about 20 carbons, and any value therebetween. In still other embodiments, the hydrophobic compound may have an alkyl chain length of from about 12 to about 18 carbons, and any value therebetween. In some embodiments, when the hydrophobically modified water-soluble polymer contains polar heteroatoms, particularly oxygen atoms such as in celluloses, the carbon length of the hydrophobic groups may be from about 1 carbon to about 20 carbons.

In those embodiments in which the hydrophobically modified water-soluble polymers are formed by first providing a hydrophilic polymer or by providing a hydrophilic polymer after polymerizing hydrophilic monomers, the molar ratio of hydrophilic polymer or hydrophilic monomers to hydrophobic compound(s) is in the range of from about 99.98:0.02 to about 90:10, encompassing any value and subset therebetween. In those embodiments in which the hydrophobically modified water-soluble polymer is formed by a polymerization reaction of a hydrophilic monomer(s) and a hydrophobically modified hydrophilic monomer(s), the molar ratio of the hydrophilic monomer(s) to hydrophobically modified hydrophilic monomer(s) in the hydrophobically modified water-soluble polymer is in the range of from about 99.98:0.02 to about 90:10, and any value therebetween.

In some embodiments, the permeability modifier may be present in the treatment fluids described herein in an amount in the range of from a lower limit of about 0.1%, 0.5%, 1%, 1.25%, 1.5%, 1.75%, 2%, 2.25%, and 2.5% to an upper limit of about 5%, 4.75%, 4.5%, 4.25%, 4%, 3.75%, 3.5%, 3.25%, 3%, 2.75%, and 2.5 by weight of the treatment fluid, encompassing any value and subset therebetween.

A cyclodextrin compound may be present in the treatment fluids described herein, as previously explained. Generally, a cyclodextrin compound is thought to be a cyclic oligosaccharide comprising at least 6 glucopyranose units joined by α-(1,4) glycoside linkages. In some instances, a cyclodextrin compound suitable for use in the embodiments described herein may have up to about 150 or more glucopyranose units joined by α-(1,4) glycoside linkages.

Figure 1:
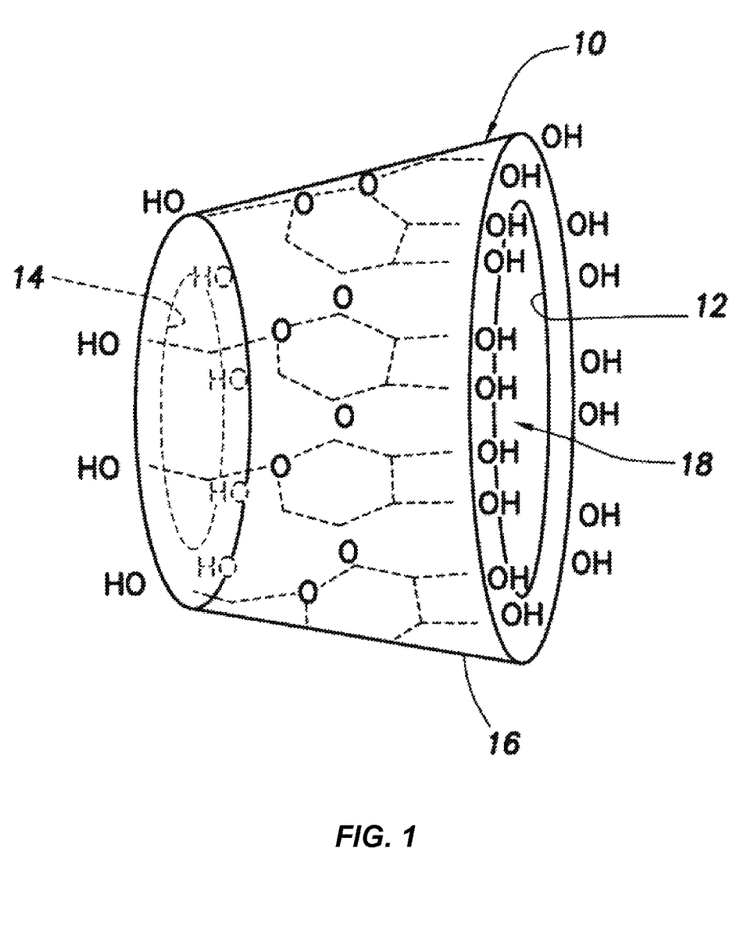
FIG. 1 illustrates the toroidal shape of a cyclodextrin compound.

Suitable cyclodextrins compounds may include, but are not limited to, α-cyclodextrin (having 6 glucopyranose units joined by α-(1,4) glycoside linkages), β-cyclodextrin (having 7 glucopyranose units joined by α-(1,4) glycoside linkages), γ-cyclodextrin (having 8 glucopyranose units joined by α-(1,4) glycoside linkages), and any combination thereof. Such cyclodextrins may be represented as toroids. Referring to FIG. 1, γ-cyclodextrin is represented as a toroid 10 with larger opening 12 and smaller opening 14 of the toroid 10 representing secondary and primary hydroxyl groups, respectively. In general, the exterior 16 of the toroid 10 should be sufficiently hydrophilic for the cyclodextrin to possess some water solubility. Internal cavity 18 of toroid 10 is generally apolar or relatively more hydrophobic and less hydrophilic than the exterior 16 of the toroid 10 and, thus, should be attractive to hydrophobic or lipophilic molecules. For example, the internal cavity 18 may be capable of hosting a hydrophobic portion of a "guest" compound, such as the deactivating surfactant, which may be contained or bound, partially, substantially, or wholly, within the internal cavity of the cyclodextrin compound.

Cyclodextrin compounds may also be derivatives of α-cyclodextrin, a β-cyclodextrin, a γ-cyclodextrin for use in forming the inclusion complexes described herein. These cyclodextrin derivatives may be prepared by introducing different functional groups to an α-cyclodextrin, a β-cyclodextrin, and/or a γ-cyclodextrin molecule by reaction with the primary hydroxyl groups and/or the secondary hydroxyl groups. Because the hydroxyl groups have different reactivity, derivatizing the cyclodextrin may result in an amorphous mixture that includes numerous isomers of different cyclodextrin derivatives. Such derivatives may be further derivatized using oligomer or polymer functional groups.

Examples of suitable cyclodextrin derivatives for use as a cyclodextrin compound described herein may include, but are not limited to, acylated cyclodextrin containing acetyl, propionyl, butyryl, or other suitable acyl groups; hydroxylated cyclodextrin containing hydroxyethyl, hydroxypropyl, or other suitable hydroxy-alkyl groups; carboxylated cyclodextrin containing carboxymethyl, carboxyethyl, or other suitable carboxyalkyl groups, and alkylated cyclodextrin containing methyl, ethyl, propyl, benzyl, or other suitable alkyl groups. Examples of some of these cyclodextrin derivatives include, but are not limited to, methyl cyclodextrins, hydroxyethyl cyclodextrins, hydroxypropyl cyclodextrins, 2-hydroxyethyl cyclodextrins, carboxymethyl cyclodextrins, and carboxyethyl cyclodextrins. In certain embodiments, cyclodextrin may have glucose or maltose attached to the cyclodextrin ring, such as glucosyl cyclodextrins and maltosyl cyclodextrins. Specific examples of suitable cyclodextrin derivatives, include, but are not limited to, glucosyl-α-cyclodextrin, maltosyl-α-cyclodextrin, glucosyl-β-cyclodextrin, maltosyl-α-cyclodextrins, methyl-α-cyclodextrin, 2-hydroxypropyl-β-cyclodextrin, hydroxyethyl-α-cyclodextrin, and 2-hydroxypropyl-γ-cyclodextrin. Combinations of the above-described cyclodextrins may also be suitable.

Cyclodextrin compound dimer and trimers may also be suitable for use in the inclusion complexes described herein. Cyclodextrin compound dimers generally include two cyclodextrin compounds covalently coupled or crosslinked together for cooperative complexing with the "guest" deactivating surfactant. Cyclodextrin compound trimers generally include three cyclodextrin compounds covalently coupled or crosslinked together for cooperative complexing with the "guest" deactivating surfactant. In other embodiments, greater than three, and even 10 or more, cyclodextrin compounds are covalently coupled or crosslinked together for cooperative complexing with the "guest" deactivating surfactant.

An example of a suitable commercially available cyclodextrin for use in the present embodiments may include, but is not limited to, CAVITRON™ cyclodextrin compounds available from Ashland Inc. in Covington, Ky.

In some embodiments, the cyclodextrin compound may be present in the treatment fluids described herein in an amount in the range of from a lower limit of about 10%, 30%, 60%, 90%, 120%, 150%, 180%, 210%, 230%, 260%, 290%, and 320% to an upper limit of about 600%, 570%, 540%, 510%, 480%, 450%, 420%, 390%, 360%, 330%, and 300% by weight of the deactivating surfactant in the treatment fluid, encompassing any value and subset therebetween. In some embodiments, the concentration of the cyclodextrin may be greater than about 1:2 weight % of the cyclodextrin compound to the deactivating surfactant, without departing from the scope of the present disclosure.

The treatment fluids may, in some embodiments, further comprise an additive designed to aid in completion of a particular subterranean formation treatment operation. Suitable additives that may be included in the treatment fluids of the present disclosure may include, but are not limited to, silica scale control additives, surfactants, gel stabilizers, anti-oxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, biocides, clay stabilizers, breakers, delayed release breakers, and the like. Combinations of these additives can be used as well. Given the benefit of the present disclosure, one of ordinary skill in the art will be able to formulate a treatment fluid having properties suitable for a given application.

In various embodiments, systems configured for delivering the treatment fluids described herein to a downhole location are described. In various embodiments, the systems can comprise a pump fluidly coupled to a tubular, the tubular containing the treatment fluids described herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the non-degradable particulates, the degradable particulates, and the proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

Figure 2:
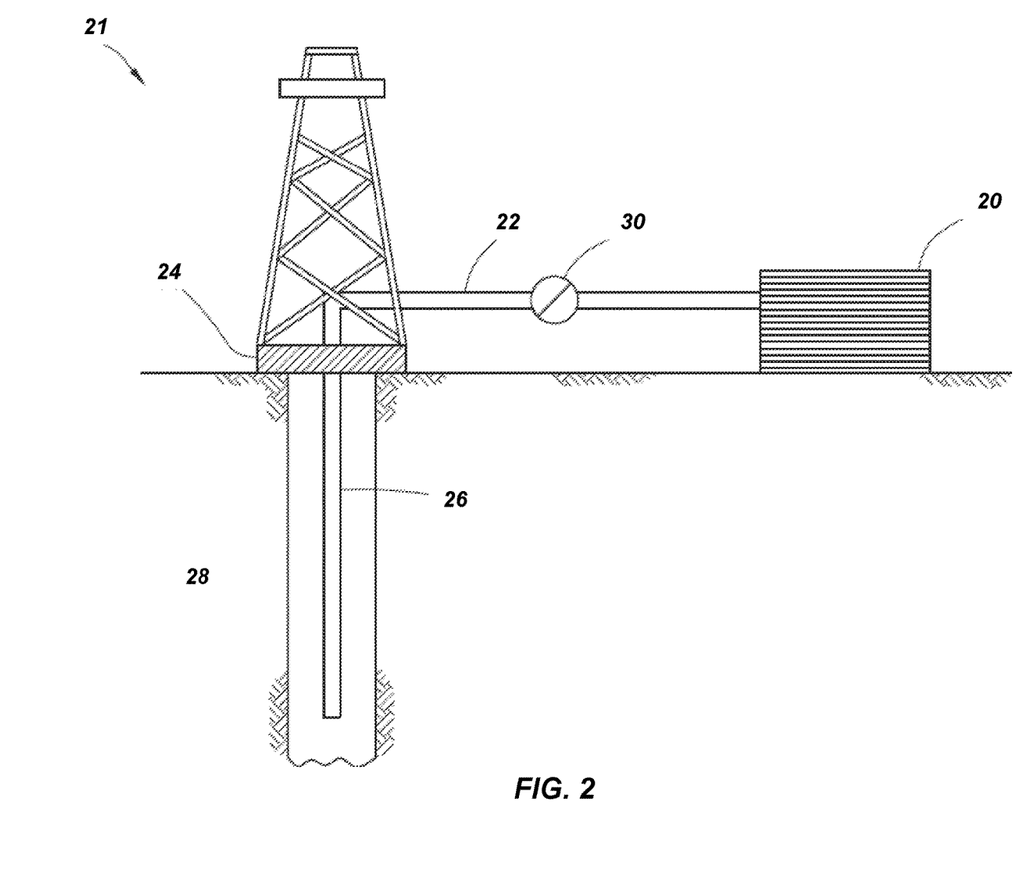
FIG. 2 shows an illustrative schematic of a system for delivering fluids described herein to a downhole location, according to one or more embodiments.

FIG. 2 shows an illustrative schematic of a system that can deliver the treatment fluids of the present disclosure to a downhole location, according to one or more embodiments. It should be noted that while FIG. 2 generally depicts a land-based system, it is to be recognized that like systems may be operated in subsea locations as well. As depicted in FIG. 2, system 21 may include mixing tank 20, in which the treatment fluids of the embodiments herein may be formulated. The treatment fluids may be conveyed via line 22 to wellhead 24, where the treatment fluids enter tubular 26, tubular 26 extending from wellhead 24 into subterranean formation 28. Upon being ejected from tubular 26, the treatment fluids may subsequently penetrate into subterranean formation 28. Pump 30 may be configured to raise the pressure of the treatment fluids to a desired degree before introduction into tubular 26. It is to be recognized that system 21 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the treatment fluid may, in some embodiments, flow back to wellhead 24 and exit subterranean formation 28. In some embodiments, the treatment fluid that has flowed back to wellhead 24 may subsequently be recovered and recirculated to subterranean formation 28.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

Embodiments disclosed herein include:

Embodiment A

A method comprising: (a) introducing a first treatment fluid into a subterranean formation having a first treatment zone having a first aqueous permeability value, the first treatment fluid comprising a first aqueous base fluid and a deactivated permeability modifier, wherein the deactivated permeability modifier is formed by micellar formation or complexation of a deactivating surfactant and a permeability modifier; (b) adsorbing the deactivated permeability modifier onto a surface of the first treatment zone; (c) introducing a second treatment fluid comprising a second aqueous base fluid and a cyclodextrin compound into the subterranean formation; (d) contacting the second treatment fluid with the deactivated permeability modifier; (e) activating the permeability modifier by complexing the deactivating surfactant with the cyclodextrin compound, thereby forming an activated permeability modifier adsorbed onto the surface of the first treatment zone; and (f) reducing the aqueous permeability of the first treatment zone to a second aqueous permeability value with the activated permeability modifier that is less than the first aqueous permeability value.

Embodiment A may have one or more of the following additional elements in any combination:

Element A1: Further comprising repeating steps (a) through (f) at at least a second treating zone.

Element A2: Wherein the subterranean formation is a hydrocarbon-bearing well, a water-bearing well, or an injection well.

Element A3: Wherein the second aqueous permeability value is in the range of about 5% to about 99.5% less than the first aqueous permeability value.

Element A4: Wherein the deactivating surfactant is selected from the group consisting of a nonionic deactivating surfactant, an anionic deactivating surfactant, a cationic deactivating surfactant, an amphoteric deactivating surfactant, and any combination thereof.

Element A5: Wherein the deactivating surfactant is selected from the group consisting of sodium dodecyl sulfate, a betaine, a sulfated alkoxylate, a sulfonated alkoxylate, an alkyl quaternary amine, an alkoxylated linear alcohol, an alkyl sulfonate, an alkyl aryl sulfonate, a C10-C20 alkyldiphenyl ether sulfonate, a polyethylene glycol, an ether of alkylated phenol, an alpha olefin sulfonate, sodium dodecane sulfonate, trimethyl hexadecyl ammonium bromide, any derivative thereof, or any combination thereof.

Element A6: Wherein the deactivating surfactant is present in the first treatment fluid in an amount in the range of from about 0.05% to about 300% by weight of the permeability modifier.

Element A7: Wherein the permeability modifier is a hydrophobically modified water-soluble polymer.

Element A8: Wherein the permeability modifier is present in the first treatment fluid in an amount in the range of about 0.1% to about 5% by weight of the first treatment fluid.

Element A9: Wherein the cyclodextrin compound is selected from the group consisting of α-cyclodextrin, β-cyclodextrin, γ-cyclodextrin, a cyclodextrin derivative, and any combination thereof.

Element A10: Wherein the cyclodextrin compound is a cyclodextrin derivative selected from the group consisting of an acylated cyclodextrin, a hydroxylated cyclodextrin, a carboxylated cyclodextrin, an alkylated cyclodextrin, a methyl cyclodextrin, a hydroxyethyl cyclodextrin, a hydroxypropyl cyclodextrin, a 2-hydroxyethyl cyclodextrin, a carboxymethyl cyclodextrin, a carboxyethyl cyclodextrin, a glucosyl cyclodextrin, a maltosyl cyclodextrin, and any combination thereof.

Element A11: Wherein the cyclodextrin compound is a cyclodextrin derivative selected from the group consisting of a hydroxypropyl-β-cyclodextrin, a glucosyl-α-cyclodextrin, a maltosyl-α-cyclodextrin, a glucosyl-β-cyclodextrin, a methyl-α-cyclodextrin, a hydroxyethyl-α-cyclodextrin, and 2-hydroxypropyl-γ-cyclodextrin, and any combination thereof.

Element A12: Wherein the cyclodextrin compound is present in the second treatment fluid in an amount in the range of about 10% to about 600% by weight of the deactivating surfactant in the first treatment fluid.

Element A13: Further comprising a tubular extending into the subterranean formation, and a pump fluidly coupled to the tubular, wherein a fluid selected from the group consisting of the first treatment fluid, the second treatment fluid, and any combination thereof is introduced into the subterranean formation through the tubular.

Element A14: Further comprising a tubular extending into the subterranean formation, and a pump fluidly coupled to the tubular, wherein a fluid selected from the group consisting of the first treatment fluid, the second treatment fluid, and any combination thereof is introduced into the subterranean formation through the tubular, and wherein the pump has a pump rate in the range of about 0.25 barrels per minute (BPM) to about 10 BPM.

By way of non-limiting example, exemplary combinations applicable to A include: A with A1 through A14; A with A2, A5, and A9; A with A1, A4, A6, and A13; A with A3, A7, and A8; A with A9, A10, A11, and A12; A with A2, A7, and A10; A with A4, A6, A12, and A13; A with A1 and A14; A with A2, A4, A10, and A14; and the like.

Embodiment B

A method comprising: (a) introducing a first treatment fluid into a subterranean formation having a first treatment zone comprising an aqueous permeability equal to a first aqueous permeability value, the first treatment fluid comprising a first aqueous base fluid and a deactivated permeability modifier, wherein the deactivated permeability modifier is formed by micellar formation or complexation of a first deactivating surfactant and a permeability modifier; (b) adsorbing the deactivated permeability modifier onto a surface of the first treatment zone; (c) introducing a second treatment fluid comprising a second aqueous base fluid and a cyclodextrin compound into the subterranean formation; (d) contacting the second treatment fluid with the deactivated permeability modifier; (e) activating the permeability modifier by complexing the first deactivating surfactant with the cyclodextrin compound, thereby forming an activated permeability modifier adsorbed onto the surface of the first treatment zone; (f) reducing the aqueous permeability of the first treatment zone to a second aqueous permeability value with the activated permeability modifier that is less than the first aqueous permeability value; (g) introducing a third treatment fluid comprising a third aqueous base fluid and a second deactivating surfactant into the subterranean formation; (h) contacting the third treatment fluid with the activated permeability modifier, thereby deactivating the activated permeability modifier by micellar formation or complexation between the second deactivating surfactant and the activated permeability modifier; and (i) restoring the aqueous permeability of the first treatment zone to the first aqueous permeability value.

Embodiment B may have one or more of the following additional elements in any combination:

Element B1: Further comprising repeating steps (a) through (i) at at least a second treating zone.

Element B2: Wherein the second aqueous permeability value is in the range of about 5% to about 99.5% less than the first aqueous permeability value.

Element B3: Wherein the first and second deactivating surfactants are selected from the group consisting of a nonionic deactivating surfactant, an anionic deactivating surfactant, a cationic deactivating surfactant, an amphoteric deactivating surfactant, and any combination thereof.

Element B4: Wherein the first and second deactivating surfactants are selected from the group consisting of sodium dodecyl sulfate, a betaine, a sulfated alkoxylate, a sulfonated alkoxylate, an alkyl quaternary amine, an alkoxylated linear alcohol, an alkyl sulfonate, an alkyl aryl sulfonate, a C10-C20 alkyldiphenyl ether sulfonate, a polyethylene glycol, an ether of alkylated phenol, an alpha olefin sulfonate, sodium dodecane sulfonate, trimethyl hexadecyl ammonium bromide, any derivative thereof, or any combination thereof.

Element B5: Wherein the first deactivating surfactant is present in the first treatment fluid in an amount in the range of from about 0.05% to about 300% by weight of the permeability modifier.

Element B6: Wherein the second deactivating surfactant is present in the third treatment fluid in an amount in the range of from about 0.05% to about 300% by weight of the permeability modifier in the first treatment fluid.

Element B7: Wherein the permeability modifier is a hydrophobically modified water-soluble polymer.

Element B8: Wherein the permeability modifier is present in the first treatment fluid in an amount in the range of about 0.1% to about 5% by weight of the first treatment fluid.

Element B9: Wherein the cyclodextrin compound is selected from the group consisting of α-cyclodextrin, β-cyclodextrin, γ-cyclodextrin, a cyclodextrin derivative, and any combination thereof.

Element B10: Wherein the cyclodextrin compound is a cyclodextrin derivative selected from the group consisting of an acylated cyclodextrin, a hydroxylated cyclodextrin, a carboxylated cyclodextrin, an alkylated cyclodextrin, a methyl cyclodextrin, a hydroxyethyl cyclodextrin, a hydroxypropyl cyclodextrin, a 2-hydroxyethyl cyclodextrin, a carboxymethyl cyclodextrin, a carboxyethyl cyclodextrin, a glucosyl cyclodextrin, a maltosyl cyclodextrin, and any combination thereof.

Element B11: Wherein the cyclodextrin compound is a cyclodextrin derivative selected from the group consisting of a hydroxypropyl-β-cyclodextrin, a glucosyl-α-cyclodextrin, a maltosyl-α-cyclodextrin, a glucosyl-β-cyclodextrin, a methyl-α-cyclodextrin, a hydroxyethyl-α-cyclodextrin, and 2-hydroxypropyl-γ-cyclodextrin, and any combination thereof.

Element B12: Wherein the cyclodextrin compound is present in the second treatment fluid in an amount in the range of about 10% to about 600% by weight of the first deactivating surfactant in the first treatment fluid.

Element B13: Further comprising a tubular extending into the subterranean formation, and a pump fluidly coupled to the tubular, wherein a fluid selected from the group consisting of the first treatment fluid, the second treatment fluid, the third treatment fluid, and any combination thereof is introduced into the subterranean formation through the tubular.

Element B14: Further comprising a tubular extending into the subterranean formation, and a pump fluidly coupled to the tubular, wherein a fluid selected from the group consisting of the first treatment fluid, the second treatment fluid, the third treatment fluid, and any combination thereof is introduced into the subterranean formation through the tubular, and wherein the pump has a pump rate in the range of about 0.25 barrels per minute (BPM) to about 10 BPM.

By way of non-limiting example, exemplary combinations applicable to B include: B with B1 through B14; B with B1, B4, and B7; B with B2, B8, B10, B11, and B14; B with B3, B5, and B12; B with B6, B8, and B13; B with B1, B4, B8, and B14; B with B10, B12, and B13; and the like.

To facilitate a better understanding of the embodiments of the present invention, the following examples of preferred or representative embodiments are given. In no way should the following examples be read to limit, or to define, the scope of the invention.

Example 1

In this example, the ability of a deactivating surfactant to improve the injectivity of the permeability modifiers was evaluated. A deactivated permeability modifier was formed using 25 milliliters (mL) of a 0.5% diluted (in a tap water base fluid) HPT-1™ hydrophobically modified water-soluble polymer (permeability modifier) and 0.32 grams (g) of sodium dodecyl sulfate (SDS) (deactivating surfactant). The deactivated permeability modifier solution was stirred for various amounts of time and aliquots were taken to measure injectivity.

The injectivity was measured by manually forcing the deactivated permeability modifier solution through 45-micron nylon filter discs attached to a 5 mL syringe. The nylon filters were water wet and may represent a subterranean formation with low permeability. The flow rates of the deactivated permeability modifier solution through the nylon filters were measured by measuring the weight of the fluid that flowed through the filter in 30 seconds. The flow rates represent a measure of the injectivity of the deactivated permeability modifier solution into a subterranean formation.

The injectivity values for the deactivated permeability modifier solution stirred for different durations was compared with those for an activated permeability modifier only solution of identical concentration (i.e., a 0.5% diluted HPT-1™ hydrophobically modified water-soluble polymer (permeability modifier) solution, without the deactivating surfactant. The activated permeability modifier solution did not flow through the filter in spite of forceful efforts. The injectivity of the deactivated permeability modifier solution is shown in Table 1 below, which increased with stirring time and reached maximum values within about 5 minutes, at which time the injection/flow rates were similar to water. The results indicate that the deactivating surfactant deactivated the permeability modifier, which also resulted in an improved injectivity profile.

TABLE 1

| Stir Time of Deactivated Permeability Modifier Solution (minutes) | Flow Rate (grams/30 secs) |
|---|---|
| 0 | 0 |
| 2 | 15 |
| 3.5 | 80 |
| 5 | 1080 |

Next, the ability of cyclodextrin to activate the deactivated permeability modifier solution was evaluated. A fresh nylon filter disc was pretreated with the deactivated permeability modifier solution described previously after 3.5 minutes (min) of stirring and attached to a fresh 5 mL syringe. A cyclodextrin solution of 5.0% hydroxypropyl-β-cyclodextrin (HPCD) in tap water was forced through the pretreated filter. After an initial spurt of few mL, the flow of the cyclodextrin solution quickly slowed down within a short time, indicating that the original performance of the deactivated permeability modifier was restored. This observation demonstrates that the flow-inhibition property of the permeability modifier (i.e., relative permeability reduction to aqueous fluids) was restored in situ while improving its injectivity significantly.

Example 2

In this example, the selective deactivation and activation of the permeability modifiers with a deactivating surfactant and cyclodextrin compound, respectively, was evaluated. The behavior of the deactivated permeability modifier solution of Example 1 was previously established. Next, the ability of a cyclodextrin to re-activate the deactivated permeability modifier was evaluated by preparing a cyclodextrin solution comprising (in order) 25 mL of 0.5% HPT-1™ (permeability modifier) in tap water, 0.32 g SDS (deactivating surfactant), and 0.5 g of HPCD. The cyclodextrin solution was forced through a nylon filter disc using a 5 mL syringe, as previously described in Example 1. Very little of the cyclodextrin solution came through the filter, indicating that the permeability modifier was activated, even though the deactivating surfactant was present, demonstrating that the HPCD negates the deactivating ability of the deactivating surfactant by, without being bound by theory, formation of a guest-host complex between the deactivating surfactant and the HPCD. The results also suggest that the deactivating surfactant possesses a stronger affinity for complexation with HPCD than to that of the permeability modifier.

Example 3

In this example, the ability of the deactivated permeability modifiers to improve injectivity without substantial loss of the ability of the permeability modifier to function after reactivation was evaluated. A fresh nylon filter disc was pretreated with a deactivated permeability modifier solution described previously in Example 1 after 3.5 minutes (min) of stirring and attached to a fresh 5 mL syringe. A cyclodextrin solution of 1 g of HPCD in 10 mL of tap water was forced through the pretreated filter. Initially, 2 g of the cyclodextrin solution was pushed through the filter within about 15 seconds. Thereafter, the flow rate substantially reduced to a slow drip, indicating that the flow-inhibition property of the permeability modifier (i.e., relative permeability reduction to aqueous fluids) was restored while improving its injectivity significantly.

Example 4

In this example, the selective deactivation and activation of the permeability modifiers with a deactivating surfactant and cyclodextrin compound, respectively, was evaluated, while taking into account the characteristic of the permeability modifiers to adsorb onto mineral surfaces (e.g., subterranean formation faces). Six (6) treatment fluids were prepared according to Table 2 below, where the permeability modifier was HPT-1™, the deactivating surfactant was SDS, and the cyclodextrin was HPCD. The treatment fluids were tested on silica flour filter cakes formed in a high pressure, high temperature (HPHT) cell using 20 g of silica flour SSA-1™ available from Halliburton Energy Services, Inc. in Houston, Tex. Each of the six treatment fluids was flowed through the filter cake and the effluent flow rate was measured. Reactivation was studied by flowing HPCD through filter cakes previously treated with the deactivated permeability modifier solution of treatment fluid C in Table 2 below. The results are shown in Table 2 and indicate that upon reactivation of the deactivated permeability modifiers with a suitable concentration of HPCD, the resultant flow rates are identical to the permeability modifier control in its activated state, indicating 100% reactivation.

TABLE 2

| Treatment Fluid | Treatment Fluid Components | Flow Rate (g/sec) |
|---|---|---|
| A | Tap Water Control | 2.69 |
| B | 0.5% Permeability Modifier in Tap Water Control | 0.02 |
| C | 0.5% Permeability Modifier in Tap Water + 0.32 g Deactivating Surfactant (45 min static mix) | 0.80 |
| D | Reactivation with 20% Cyclodextrin Solution in Tap Water | 0.02 |
| E | Reactivation with 10% Cyclodextrin Solution in Tap Water | 0.03 |
| F | Reactivation with 1% Cyclodextrin Solution in Tap Water | 0.91 |

Example 5

In this example, the selective deactivation and activation of the permeability modifiers with a deactivating surfactant and cyclodextrin compound, respectively, was again evaluated, while taking into account the characteristic of the permeability modifiers to adsorb onto mineral surfaces (e.g., subterranean formation faces). In this example, a Berea sandstone core was used to stimulate the mineral surface. The Berea core was assembled in a Hassler set-up and the experiments were performed at room temperature. The Berea core had an initial 2% KCl brine in tap water permeability of about 170-180 mD. After establishing the initial brine permeability (Stage #1), several fluids were flowed through the Berea core where the permeability modifier was HPT-1™, the deactivating surfactant was SDS, and the cyclodextrin was HPCD. First, a 0.5% Permeability Modifier in 2% KCl in Tap Water Control was prepared and flowed through the core (Stage #2). Permeability reduction was measured by flowing brine (7% KCl in tap water) through the core (Stage #3). Thereafter, a 1.28% in a 2% KCl tap water solution of the deactivating surfactant SDS was flowed through the core (Stage #4) to deactivate the permeability modifier. Finally, a 3% by weight cyclodextrin solution of HPCD in a 2% KCl tap water solution was flowed through the core (Stage #5) to reactivate the permeability modifier. The permeability results are shown in FIG. 3 and the pressure change results are shown in FIG. 4.

Figure 3:
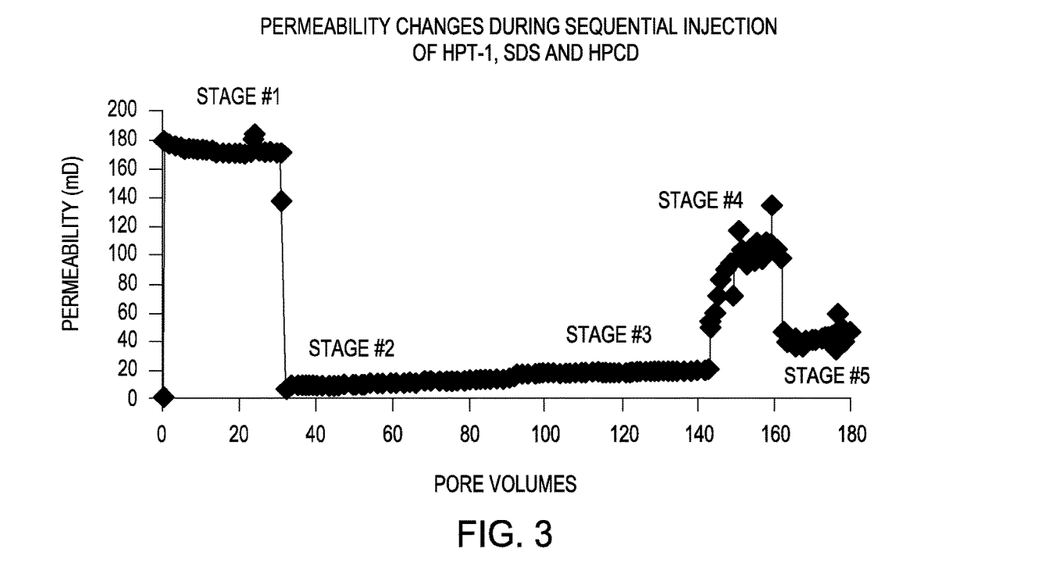
FIG. 3 shows permeability changes during sequential injection of the treatment fluids, according to one or more embodiments of the present disclosure.

With reference to FIG. 3, the permeability changes during sequential injection demonstrate that the permeability of the core increased upon injection of the deactivating surfactant at Stage #4, representing deactivation of the permeability modifier. Upon treatment with the cyclodextrin solution, permeability reduction is again observed at Stage #5. Based on the results shown in Example 4 above, it is expected that increased concentration of the cyclodextrin would lead to even further permeability decreases at Stage 5 (e.g., permeabilities similar to Stage#2).

Figure 4:
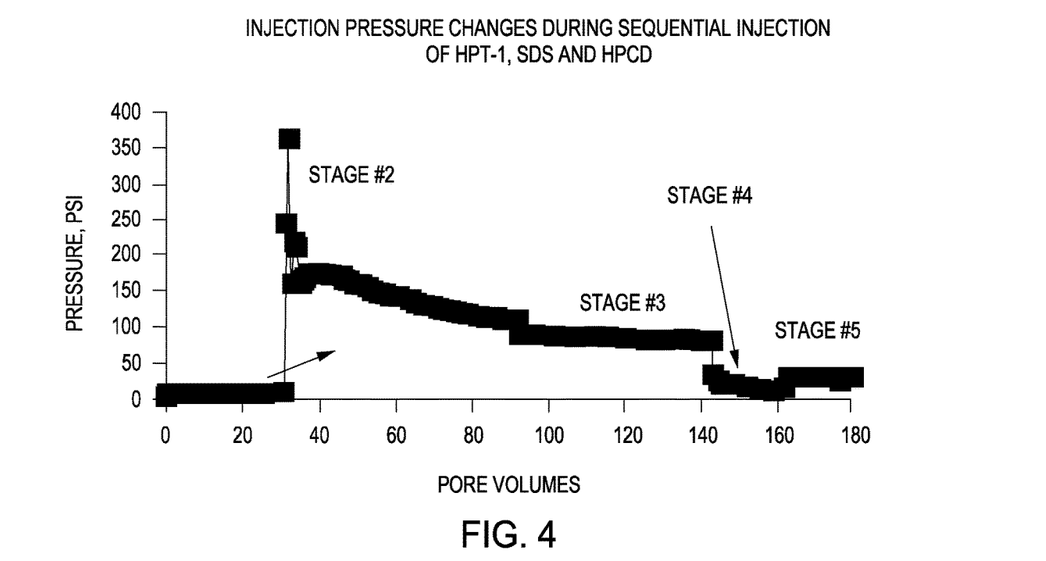
FIG. 4 shows injection pressure changes during sequential injection of the treatment fluids, according to one or more embodiments of the present disclosure.

Referring now to FIG. 4, the pressure changes observed during sequential injection are consistent with selective deactivation and reactivation of the permeability modifier. For example, the injection pressure decreased with injection of the deactivating surfactant at Stage #4 due to deactivation of the permeability modifier, resulting in an increased injectivity profile, and increased again upon reactivation upon contact with the cyclodextrin solution at Stage #5. The results show that repetitive injection of the permeability modifier and the deactivating surfactant prior to reactivation with the cyclodextrin solution allows for deep placement of the deactivated permeability modifier in a subterranean formation, allowing for injectivity profile modification in enhanced oil recovery operations, for example, among other subterranean formation operations as previously discussed.

Example 6

Figure 5:
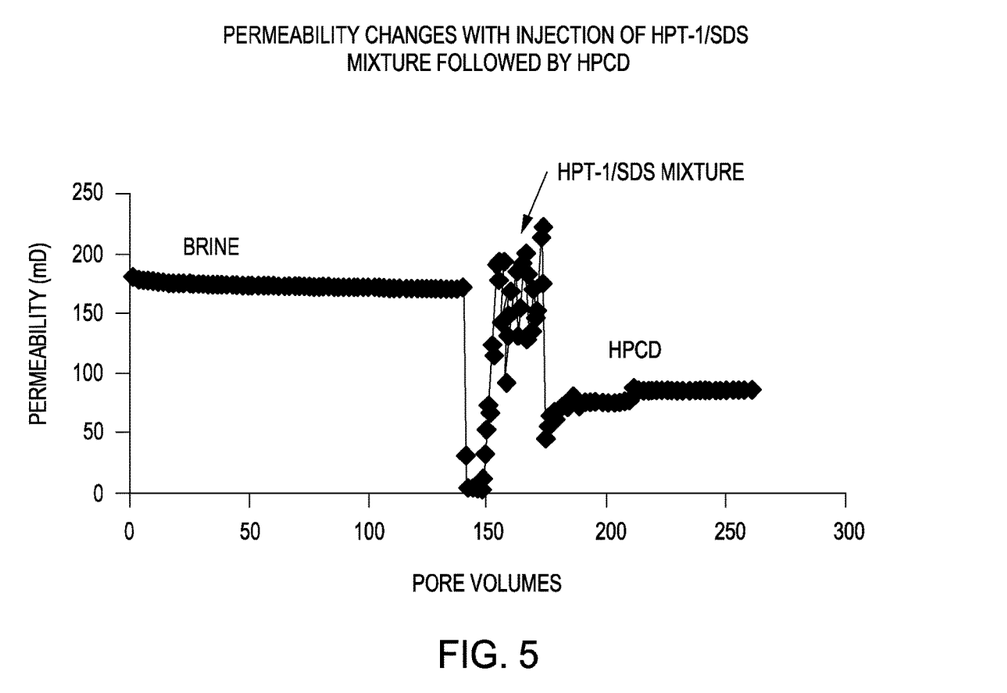
FIG. 5 shows permeability changes during sequential injection of the treatment fluids, according to one or more embodiments of the present disclosure.

In this example, the selective deactivation and activation of the permeability modifiers with a deactivating surfactant and cyclodextrin compound, respectively, was evaluated. A treatment fluid comprising a deactivated permeability modifier of 0.5% HPT-1™ permeability modifier in tap water+ 0.32 g deactivating surfactant SDS was shown not to provide substantial permeability reduction of a Berea sand stone core. The Berea sand stone core was prepared according to Example 5 above. As shown in FIG. 5, the initial permeability of a 2% KCl brine in tap water was determined at about 170-180 mD. Injection of the deactivated permeability modifier shows permeabilities substantially equal to the brine. Thereafter, a cyclodextrin solution of 1% HPCD in tap water was flowed through the core and the permeability reduced, indicating activation of the permeability modifier, as described herein.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A and B" or "at least one of A or B" each refer to only A, only B, or only C; any combination of A, B, and C; and/or at least one of each of A, B, and C.

The invention claimed is:

1. A method comprising:
   introducing a first treatment fluid comprising a deactivated permeability modifier in to a subterranean formation having a first treatment zone comprising a water-bearing section at pressures below a fracture gradient of the formation;
   adsorbing the deactivated permeability modifier from the first treatment fluid onto a surface of the first treatment zone in the subterranean formation, the first treatment zone having a first aqueous permeability value;
      wherein the first treatment fluid comprises a first aqueous base fluid and the deactivated permeability modifier, the deactivated permeability modifier being formed by micellar formation or complexation of a deactivating surfactant and a permeability modifier;
   introducing a second treatment fluid comprising a second aqueous base fluid and a cyclodextrin compound into the subterranean formation; and contacting the second treatment fluid with the deactivated permeability modifier while the deactivated permeability modifier is adsorbed onto the surface of the first treatment zone, to form thereby an activated permeability modifier adsorbed onto the surface of the first treatment zone by complexing a hydrophobic portion of the deactivating surfactant with a hydrophobic internal cavity of the cyclodextrin compound;
  wherein the first treatment zone has a second aqueous permeability value that is less than the first aqueous permeability value after the activated permeability modifier is formed.

2. The method of claim 1, further comprising:
adsorbing the deactivated permeability modifier onto a surface of a second treatment zone in the subterranean formation, the second treatment zone having a third aqueous permeability value; and
contacting the second treatment fluid with the deactivated permeability modifier while the deactivated permeability modifier is adsorbed onto the surface of the second treatment zone;
  wherein the second treatment zone has a fourth aqueous permeability value that is less than the third aqueous permeability value after the activated permeability modifier is formed.

3. The method of claim 1, wherein the first treatment fluid is introduced to the subterranean formation via a hydrocarbon-bearing well, a water-bearing well, or an injection well.

4. The method of claim 1, wherein the second aqueous permeability value is in a range of about 5% to about 99.5% less than the first aqueous permeability value.

5. The method of claim 1, wherein the deactivating surfactant is selected from the group consisting of a nonionic deactivating surfactant, an anionic deactivating surfactant, a cationic deactivating surfactant, an amphoteric deactivating surfactant, and any combination thereof.

6. The method of claim 1, wherein the deactivating surfactant is selected from the group consisting of sodium dodecyl sulfate, a betaine, a sulfated alkoxylate, a sulfonated alkoxylate, an alkyl quaternary amine, an alkoxylated linear alcohol, an alkyl sulfonate, an alkyl aryl sulfonate, a C10-C20 alkyldiphenyl ether sulfonate, a polyethylene glycol, an ether of alkylated phenol, an alpha olefin sulfonate, sodium dodecane sulfonate, trimethyl hexadecyl ammonium bromide, and any combination thereof.

7. The method of claim 1, wherein the deactivating surfactant is present in the first treatment fluid in an amount of about 0.05% to about 300% by weight of the permeability modifier.

8. The method of claim 1, wherein the permeability modifier is a hydrophobically modified water-soluble polymer.

9. The method of claim 1, wherein the permeability modifier is present in the first treatment fluid in an amount of about 0.1% to about 5% by weight of the first treatment fluid.

10. The method of claim 1, wherein the cyclodextrin compound is selected from the group consisting of an α-cyclodextrin, a β-cyclodextrin, a γ-cyclodextrin, and any combination thereof.

11. The method of claim 10, wherein the α-cyclodextrin, the β-cyclodextrin, the γ-cyclodextrin, and any combination thereof is selected from the group consisting of an acylated cyclodextrin, a hydroxylated cyclodextrin, a carboxylated cyclodextrin, an alkylated cyclodextrin, a methyl cyclodextrin, a hydroxyethyl cyclodextrin, a hydroxypropyl cyclodextrin, a 2-hydroxyethyl cyclodextrin, a carboxymethyl cyclodextrin, a carboxyethyl cyclodextrin, a glucosyl cyclodextrin, a maltosyl cyclodextrin, and any combination thereof.

12. The method of claim 1, wherein the cyclodextrin compound is selected from the group consisting of a hydroxypropyl-β-cyclodextrin, a glucosyl-α-cyclodextrin, a maltosyl-α-cyclodextrin, a glucosyl-β-cyclodextrin, a methyl-α-cyclodextrin, a hydroxyethyl-α-cyclodextrin, 2-hydroxypropyl-γ-cyclodextrin, and any combination thereof.

13. The method of claim 1, wherein the cyclodextrin compound is present in the second treatment fluid in an amount of about 10% to about 600% by weight of the deactivating surfactant in the first treatment fluid.

14. The method of claim 1, wherein a tubular extends into the subterranean formation and a pump is fluidly coupled to the tubular, and a fluid selected from the group consisting of the first treatment fluid, the second treatment fluid, and any combination thereof is introduced into the subterranean formation through the tubular.

15. The method of claim 1, wherein the deactivating surfactant is sodium dodecyl sulfate and the permeability modifier is hydroxypropyl β-cyclodextrin.

16. A method comprising:
introducing a first treatment fluid comprising a deactivated permeability modifier in to a subterranean formation having a first treatment zone comprising a water-bearing section at pressures below a fracture gradient of the formation;
adsorbing the deactivated permeability modifier from the first treatment fluid onto a surface of the first treatment zone in the subterranean formation, the first treatment zone having a first aqueous permeability value;
  wherein the first treatment fluid comprises a first aqueous base fluid and the deactivated permeability modifier, the deactivated permeability modifier being formed by micellar formation or complexation of a sodium dodecyl sulfate as a first deactivating surfactant and a permeability modifier;
introducing a second treatment fluid comprising a second aqueous base fluid and hydroxypropyl β-cyclodextrin as a cyclodextrin compound into the subterranean formation;
contacting the second treatment fluid with the deactivated permeability modifier while the deactivated permeability modifier is adsorbed onto the surface of the first treatment zone, thereby forming an activated permeability modifier adsorbed onto the surface of the first treatment zone by complexing a hydrophobic portion of the first deactivating surfactant with a hydrophobic internal cavity of the cyclodextrin compound;
  wherein the first treatment zone has a second aqueous permeability value that is less than the first aqueous permeability value after the activated permeability modifier is formed;
introducing a third treatment fluid comprising a third aqueous base fluid and a sodium dodecyl sulfate as a second deactivating surfactant into the subterranean formation
to contact the third treatment fluid with the activated permeability modifier while the activated permeability modifier is adsorbed onto the surface of the first treatment zone, thereby deactivating the activated permeability modifier by micellar formation or complexation between the second deactivating surfactant and the activated permeability modifier, and restoring an aqueous permeability of the first treatment zone to the first aqueous permeability value.

17. The method of claim 16, further comprising:

adsorbing the deactivated permeability modifier onto a surface of a second treatment treatment zone in the subterranean formation, the second treatment zone having a third aqueous permeability value;

contacting the second treatment fluid with the deactivated permeability modifier while the deactivated permeability modifier is adsorbed onto the surface of the second treatment zone;

wherein the second treatment zone has a fourth aqueous permeability value that is less than the third aqueous permeability after the activated permeability modifier is formed; and contacting the third treatment fluid with the activated permeability modifier while the activated permeability modifier is adsorbed onto the surface of the second treatment zone, thereby deactivating the activated permeability modifier by micellar formation or complexation of the second deactivating surfactant and the activated permeability modifier;

wherein an aqueous permeability of the second treatment zone is restored to the third aqueous permeability value after the deactivated permeability modifier is re-formed.

18. The method of claim 16, wherein the second deactivating surfactant is present in the third treatment fluid in an amount of about 0.05% to about 300% by weight of the permeability modifier in the first treatment fluid.

19. The method of claim 16, wherein a tubular extends into the subterranean formation and a pump is fluidly coupled to the tubular, and a fluid selected from the group consisting of the first treatment fluid, the second treatment fluid, the third treatment fluid, and any combination thereof is introduced into the subterranean formation through the tubular.

* * * * *